United States Patent Office 3,314,061
Patented Apr. 11, 1967

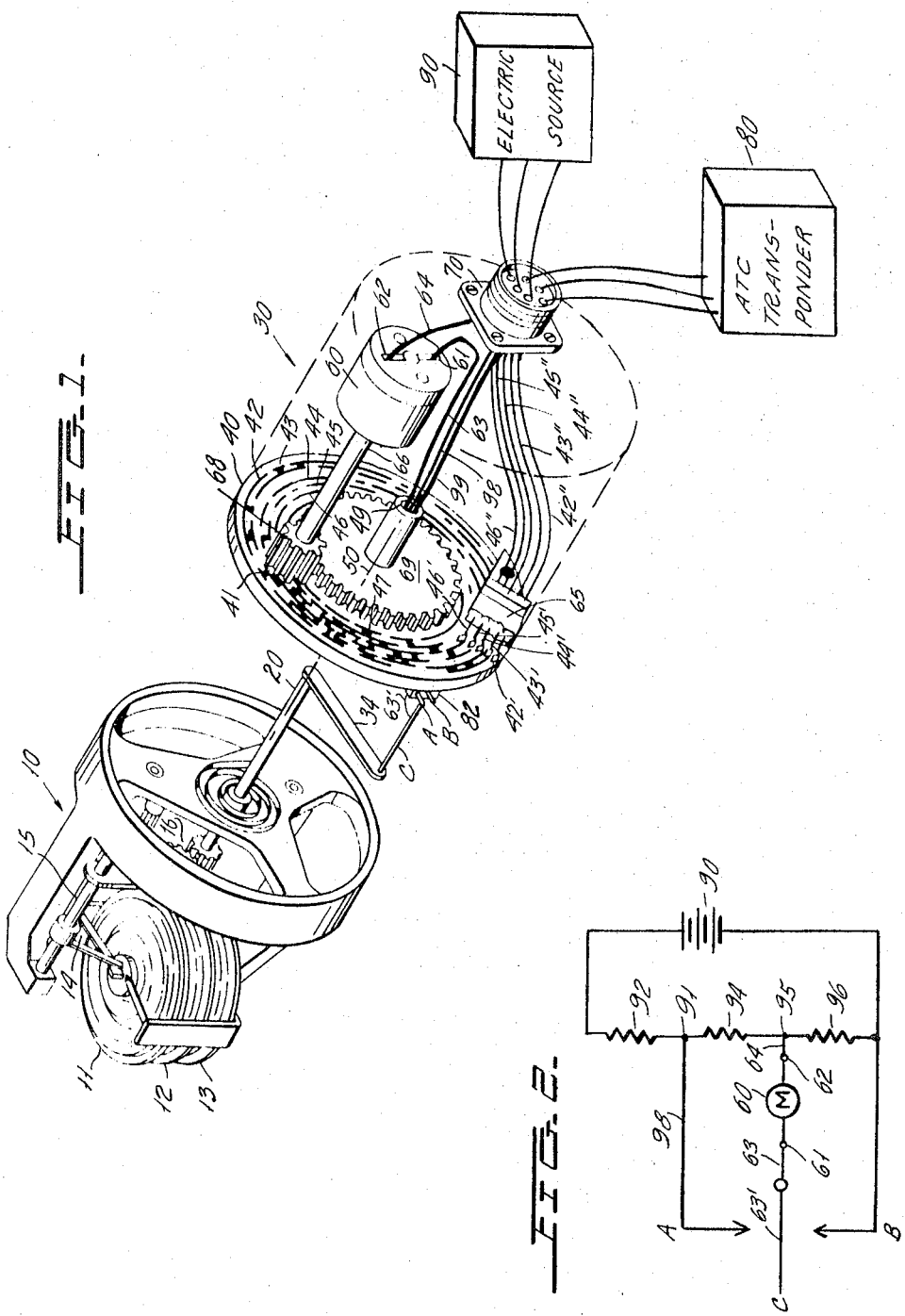

3,314,061
SERVO ALTIMETER
William F. Magagnos, Glen Cove, N.Y., assignor to Kollsman Instrument Corporation, Elmhurst, N.Y., a corporation of New York
Filed June 24, 1963, Ser. No. 289,948
9 Claims. (Cl. 340—347)

This invention relates to a navigational apparatus, and more particularly to such an apparatus having an automatic encoder arrangement to provide in-flight navigational data to an Air Traffic Control transponder.

It is known in the aircraft instrumentation art to measure various navigational parameters by providing a device automatically responsive to variations in the parameter being measured. For example, to measure altitude, an aneroid cell may be provided which when subjected to atmospheric change will expand or contract an amount proportional to the attendant pressure change. The movement of the aneroid cell is then typically interconnected to a pointer to thereby provide the pilot with a visual display.

In addition to providing the pilot with such in-flight information, the need also exists to relay such information to ground stationed air traffic controllers. Previously, such information had oftentimes been relayed by a direct voice communication link between the aircraft personnel and the ground station air traffic controller. However, increasing demands resulting from the variety and number of aircraft presently being flown, has necessitated specific regulations for automatically encoding and transmitting such in-flight data; with one such system being designated by the Federal Aeronautics Administration as Small Light-weight Altitude Transmission Equipment I (SLATE I).

To automatically provide such data transmission, various encoder arrangements of converting the navigational information to digital form have been previously practiced. However, the systems heretofore devised have been quite complex and intricate, and accordingly have demonstrated considerably less than a practical solution. Accordingly, my invention provides automatic encoding of such navigational information in an extremely simplified manner offering considerable simplicity of operation, increased reliability and cost-reduction over the prior systems.

Basically, my invention provides follow-up servo positioning of an encoder disc responsive to movement of the navigational sensing device. In the illustrative embodiment of my invention, a conventional type of altimeter is shown, with the output shaft thereof having an encoder positioning contact rotatable therewith, responsive to altitude variation. A rotatable encoder disc, concentrically placed with respect to the altimeter output shaft, carries a pair of spaced-apart polarity sensitive contacts; the latter contacts being placed about the encoder positioning contact. Movement of the altimeter shaft effects engagement of the encoder positioning contact with one of the polarity sensitive contacts to apply a polarity sensitive drive control signal to a servo-motor. The polarity of the signal is system-coordinated with respect to the servo-drive to rotate the encoder disc for follow-up movement thereof, as controlled by the cooperating contact engagement, responsive to either increasing or decreasing altitude. Thus, it is seen that the follow-up movement of the encoder disc is provided by the direct engagement of an extremely simplified polarity sensitive contact arrangement, thereby advantageously avoiding the need for a servo-amplifier, synchrotrol, and various other intricate devices as typically included in the more complex encoder positioning arrangements of the prior art.

The encoder disc advantageously includes a plurality of channels of digital data in concentric annular array, coded in conformance with FAA requirements, for encoded in-flight altitude data. A set of read-out brushes fixedly positioned with respect to the encoder disc, and in registry with corresponding annular channels thereof, presents the encoded digital data to an appropriate ATC transponder, for ground transmission upon interrogation of the transponder.

It is therefore seen that the basic concept of my invention resides in providing accurate encoded in-flight data in a simplified, efficient and inexpensive manner. More particularly, the illustrative embodiment of my invention advantageously fulfills the altitude reporting requirements set forth by the FAA for Small Lightwave Altitude Transmission Equipment I.

It is therefore a basic object of my invention to provide encoded navigational data in a simplified and efficient manner.

A further object of my invention is to provide follow-up positioning of an encoder disc by the cooperation of first and second polarity sensitive contacts carried thereon, and a third contact positionable responsive to variations of the parameter being sensed.

An additional object of this invention is to provide such follow-up positioning wherein movement of the encoder disc is controlled by a polarity sensitive servo-motor, one input terminal of which is connected to the third contact, and the other input terminal of which is connected to a potential intermediate the potentials applied to the first and second contacts.

Still another object of this invention is to provide such follow-up positioning of an encoder disc, wherein a direct connection from the polarity sensitive contacts to the polarity sensitive servo-motor advantageously avoids the need for a servo-amplifier.

Still a further object of my invention is to provide an alti-coder arrangement wherein the output shaft of a conventional altimeter carries an electrical contact, positioned intermediate polarity sensitive contacts carried by an encoder disc to effect follow-up movement of the encoder disc responsive to movement of the altimeter shaft.

Still an additional object of this invention is to provide such an alti-coder arrangement wherein the encoder disc includes a plurality of channels of digital information in concentric annular array to satisfy the requirements as set forth by the FAA SLATE I specifications.

These as well as other objects of my invention will readily become apparent upon reading the following description and accompanying drawings in which:

FIGURE 1 is a perspective view of an alti-coder constructed in accordance with the basic concept of my invention, with the housing removed to show its operation.

FIGURE 2 schematically shows the electrical interconnection of the apparatus shown in FIGURE 1.

Referring to the figures, the altimeter mechanism, generally indicated as 10, is a conventional type of aneriod cell unit, the output of which is coupled to the encoder system of my invention, generally designated as 30. It is to be understood that altimeter 10 is only illustrative of one of the numerous types of flight instruments which may be integrated with encoder arrangement 30. More specifically, the follow-up servo positioning of encoder disc 40 with respect to the movement of altimeter shaft 20, as will be subsequently set forth, may likewise be practiced with numerous other types of specific altimeter constructions, or other navigational instruments.

Altimeter mechanism 10 is preferably shown as including a ganged array of three aneroid cells 11–13, to expand and contract in accordance with variations in atmospheric pressure; with the provision of three such individual cells being provided for increased sensitivity of operation. Accordingly, the movement of the diaphragms thereof is transferred through jeweled-pivoted linkages 14, shaft 15 and gearing arrangement 16, to rotate output shaft 20 proportional to the attendant atamospheric change. Altimeter 10 is preferably referenced to 29.92 inches of mercury, and may also include bimetallic temperature compensation means and an interconnecting linkage for a visual display pointer (not shown).

In accordance with my invention, the rotation of output shaft 20 effects actuation of a servo-drive motor 60 to rotate an encoder disc 40 about longitudinal axis 50 in accurate follow-up relationship therewith. I accomplish this in an extremely simplified manner by the provision of a contact element C mechanically interconnected to the altitude output shaft 20 as by linkage bar 34, to rotate about longitudinal axis 50 responsive to the altitude variation sensed by altimeter device 10. Contact C is positioned intermediate polarity sensitive drive control contacts A, B directly carried by encoder disc 40. Contacts A, B are in spaced-apart relationship, about encoder drive control contact C, such that clockwise rotation of the altimeter output shaft 20 will effect engagement of contacts A and C. Similarly, counterclockwise rotation of the altimeter output shaft 20 will effect engagement of contacts C and B. As will be subsequently shown, such engagement of the polarity sensitive contacts, A or B, carried by disc 40, and the encoder drive control contact C presents a follow-up servo signal to drive motor 60 of a proper polarity to effect corresponding rotational movement of encoder disc 40 about axis 50. Servo-motor 60 preferably possesses very low value of rotor inertia, inductance and power drain. By virtue of the motor characteristics in conjunction with the direct engagement of the polarity sensitive contacts A–B and the output shaft carried contact C, I provide greatly increased reliability over the substantially more complex encoder arrangements of the prior art.

The forward surface 42 of encoder disc 40 is shown as containing a plurality of channels 42–46 of digital information in concentric annular array, with such information being read out by brush assembly 65. That is, brush assembly 65 is stationarily positioned with respect to rotatable disc 40. The follow-up rotational movement of disc 40 responsive to movement of altimeter output shaft 20 provides an angular registry relationship between the digital channels 42–46 and their corresponding brush-elements 42′–46′, with the brush-heads being electrically connected to output connector 70 via conducting members 42″–46″. Accordingly, the encoded rotational positioning of disc 40 is then presented to a conventional type of ATC transponder 80 to automatically provide digitally coded in-flight altitude information, as for example between −1,000 to +20,000 feet upon interrogation thereof.

The polarity sensitive terminals A, B are integrally contained by peripherally located terminal block assembly 82, and electrically connected to output adapter 70, by wires 98, 99 passing through central aperture 49 of the encoder disc. Peripherally located terminal block 42 may be electrically connected to the centrally located input conductors 98, 99 as by a conventional slip-ring assembly (not shown). Similarly, wire 63 interconnecting servo-motor terminal 61 to encoder drive control terminal C passes through central encoder disc aperture 49 and may also be electrically connected to terminal block 42 by a slip-ring assembly, with a jumper gap 63′ being provided intermediate contact carrying terminal block 42 and terminal C.

Reference is now made to the electrical schematic of FIGURE 2, which shows my simplified manner of providing follow-up servo movement of encoder disc 40. Energization is provided by potential source 90; which may for example be a ten-volt, Zener controlled, D.C. input of 1 watt maximum power. A dropping resistor 92 may preferably be provided for current limitation and appropriate adjustment of the potential source with respect to servo motor 60 requirements. A voltage divider network is formed of resistors 94, 96, with the central terminal thereof, 95, being connected to input terminal 62 of polarity sensitive servo-motor 60. The other terminal 61 of polarity sensitive servo-motor 60 is electrically connected to terminal C of the altimeter output shaft 20. Contact elements A, B, carried by encoder disc 40, are electrically connected to the opposed terminals 91, 93 of voltage divider network 94, 96 by conductors 98, 99 respectively. Accordingly, it is seen that the potential applied to terminals A and B is at opposite polarities with respect to the potential applied to terminal 62 of polarity sensitive servo-motor 60. Hence, the application of the potential present at encoder contact A to terminal 61 of the polarity sensitive motor 60 (via the engagement of contacts A and C) will provide rotation in one direction (e.g. clockwise); with the application of the potential present at encoder contact B to input terminal 61 of the motor (via the engagement of contacts B and C) providing opposite directional movement (e.g. counter-clockwise).

Having now described the structural and electrical arrangement of an altimeter encoder arrangement constructed in accordance with the preferred teachings of my invention, its operation is as follows: Upon clockwise movement of altimeter output shaft 20, as for example corresponding to increasing altitude, contact engagement will be made between contact C movable therewith and contact terminal A carried by the encoder disc 40. Electrical engagement of contact elements A and C will provide a positive drive control signal intermediate terminals 61–62 of polarity sensitive servo-motor 60, to rotate its output shaft 66, pinion 68 and drive gear 69 in a direction to similarly effect clockwise rotation of encoder disc 40, thereby defeating the electrical and mechanical engagement of contact elements A and C. That is, encoder disc 40 will be follow-up positioned responsive to the clockwise rotation of altimeter shaft 20 to defeat the engagement of contact elements A and C, and accordingly energization of servo-motor 60. The counterclockwise movement of shaft 20 provides similar operation with the engagement of contact elements C carried thereby and encoder contact element B presenting a negative drive control signal intermediate motor contacts 61–62 to effect follow-up counterclockwise positioning of encoder disc 40. It is to be noted that the potential applied to drive control servo-motor 60 is directly obtained via the engagement of polarity sensitive contact assembly A, B, and encoder drive control contact C, with there being no need for an intermediate amplifier.

It is thus seen that my invention provides an extremely simplified apparatus for accurately and directly positioning an encoder disc responsive to the shaft rotation of a basic sensing device. The overall device may be compactly assembled to form a unit having maximum external dimensions of 3¼″ diameter, 5½″ depth, and weighing only two pounds. Accordingly, the unit may be easily intergrated within numerous aircraft and only requires a normal pneumatic input, and a low power D.C. input for its operation.

Although in the foregoing specification, I have described a preferred embodiment of my novel invention, many variations and modifications will now become apparent to those skilled in the art, and I prefer therefore to be limited not by the specific disclosure contained herein but only by the appended claims.

The embodiments of the invention in which an exclusive privilege or property is claimed are defined as follows:

1. In a navigational apparatus, an encoder arrangement comprising:
   a rotatable encoder disc having data annularly disposed about a first surface thereof;

first and second contact elements carried by said encoder disc, in spaced apart angular relationship;
a potential source having first, second and third terminals;
said first and second potential source terminals being at opposite polarities with respect to said third potential source terminal;
said first and second potential source terminals directly connected to said first and second contact elements;
a third contact element rotatable responsive to variations in a navigational parameter to be encoded, and disposed intermediate said first and second contact elements;
a polarity sensitive servo motor operatively connected to said encoder disc for controlled rotation thereof;
said third contact element directly connected to a first terminal of said servo motor;
a second terminal of said servo motor directly connected to said third potential source terminal, clockwise rotation of said third contact element effecting engagement thereof with said first contact element, thereby electrically connecting said first contact element to said first servo motor terminal; the application to said servo motor of the potential defined by said first and third potential source terminals providing follow-up clockwise rotation of said encoder disc;
counter-clockwise rotation of said third contact element effecting engagement thereof with said second contact element, thereby electrically connecting said second contact element to said servo motor first terminal; the application to said servo motor of the potential defined by said second and third potential source terminals providing follow-up counterclockwise rotation of said encoder disc.

2. The apparatus as set forth in claim 1, wherein:
said first, second and third contact elements are circularly disposed about the center of said encoder disc, rotation of said third contact element, and follow-up rotation of said encoder disc, re-positioning said first and second contact elements in non-contact relationship about said third contact element; the movement of said first, second and third contact elements being defined by an annular section of said encoder disc.

3. An encoder arrangement for a navigational apparatus having an output shaft means movable responsive to variations of a navigational parameter being sensed; said encoder arrangement comprising:
first drive control contact means operatively connected to said output shaft means and movable therewith;
an encoder disc;
drive means for moving said encoder disc responsive to a drive control signal;
second drive control contact means operatively connected to said encoder disc and movable therewith;
movement of said output shaft in a first direction effecting a first engaged condition of said first and second drive control contact means to present a first drive control signal to said drive means; said first drive control signal moving said encoder disc in a first direction to defeat said first engaged condition;
movement of said output shaft in a second direction effecting a second engaged condition of said first and second drive control contact means to present a second drive control signal to said drive means; said second drive control signal moving said encoder disc in a second direction to defeat said second engaged condition whereby said encoder disc is controllably moved to follow the movement of said output shaft means.

4. An encoder arrangement for a navigational apparatus having an output shaft means movable responsive to variations of a navigational parameter being sensed; said encoder arrangement comprising:
first drive control contact means operatively connected to said output shaft means and movable therewith;
an encoder disc;
drive means for moving said encoder disc responsive to a drive control signal;
second drive control contact means operatively connected to said encoder disc and movable therewith;
movement of said output shaft in a first direction effecting a first engaged condition of said first and second drive control contact means to present a first drive control signal to said drive means; said first drive control signal moving said encoder disc in a first direction to defeat said first engaged condition;
movement of said output shaft in a second direction effecting a second engaged condition of said first and second drive control contact means to present a second drive control signal to said drive means; said second drive control signal moving said encoder disc in a second direction to defeat said second engaged condition whereby said encoder disc is controllably moved to follow the movement of said output shaft means;
said drive means including a polarity sensitive servo-motor; a first terminal of said servo-motor connected to a reference potential, and a second terminal of said servo-motor connected to said first drive control contact means;
said second drive control contact means including first and second contact elements, connected to first and second potentials respectively, said first and second potentials being of opposite polarity with respect to said reference potential;
said first engaged condition corresponding to the engagement of said first drive control contact means and said first contact element, whereby said first potential is applied to said servo-motor;
said second engaged condition corresponding to the engagement of said first drive control contact means and said second contact element, whereby said second potential is aplied to said servo-motor.

5. The encoder arrangement as set forth in claim 4, wherein:
said first and second contact elements are carried by said encoder disc in spaced-apart relationship;
said first drive control contact means being a single contact element intermediate said first and second contact elements, and rotatable about the axis of said encoder disc;
the engagement of the contact elements of said first and second contact means effecting follow-up servo movement of said encoder disc,
and the disengagement of said contact elements providing a servo null condition.

6. An encoder arrangement for a navigational apparatus having an output shaft means movable responsive to variations of a navigational parameter being sensed; said encoder arrangement comprising:
first drive control contact means operatively connected to said output shaft means and movable therewith;
an encoder disc;
drive means for moving said encoder disc responsive to a drive control signal;
second drive control contact means operatively connected to said encoder disc and movable therewith;
movement of said output shaft in a first direction effecting a first engaged condition of said first and second drive control contact means to present a first drive control signal to said drive means; said first drive control signal moving said encoder disc in a first direction to defeat said first engaged condition;
movement of said output shaft in a second direction effecting a second engaged condition of said first and second drive control contact means to present a second drive control signal to said drive means; said second drive control signal moving said encoder disc in a second direction to defeat said second engaged condition whereby said encoder disc is controllably moved to follow the movement of said output shaft means;
said drive means including a polarity sensitive servo-motor; a first terminal of said servo-motor connected to a reference potential, and to second terminal of said servo-motor connected to said first drive control contact means;
said second drive control contact means including first and second contact elements, connected to first and second potentials respectively; said first and second potentials being of opposite polarity with respect to said reference potential;
said first engaged condition corresponding to the engagement of said first drive control contact means and said first contact element, whereby said first potential is applied to said servo-motor;
said second engaged condition corresponding to the engagement of said first drive control contact means and said second contact element, whereby said second potential is applied to said servo-motor;
said encoder disc having a plurality of channels of digital data in concentric annular array about a first surface thereof;
encoder output means positioned at a fixed position with respect to said encoder disc, whereby the controlled movement of said encoder disc provides corresponding digital data in registry with said encoder output means.

7. An encoder arrangement for a navigational apparatus having an output shaft means movable responsive to variations of a navigational parameter being sensed; said encoder arrangement comprising:
first drive control contact means operatively connected to said output shaft means and movable therewith;
an encoder disc;
drive means for moving said encoder disc responsive to a drive control signal;
second drive control contact means operatively connected to said encoder disc and movable therewith;
movement of said output shaft in a first direction effecting a first engaged condition of said first and second drive control contact means to present a first drive control signal to said drive means; said first drive control signal moving said encoder disc in a first direction to defeat said first engaged condition;
movement of said output shaft in a second direction effecting a second engaged condition of said first and second drive control contact means to present a second drive control signal to said drive means; said second drive control signal moving said encoder disc in a second direction to defeat said second engaged condition whereby said encoder disc is controllably moved to follow the movement of said output shaft means;
said drive means including a polarity sensitive servo-motor; a first terminal of said servo-motor connected to a reference potential, and a second terminal of said servo-motor connected to said first drive control contact means;
said second drive control contact means including first and second contact elements, connected to first and second potentials respectively, said first and second potentials being of opposite polarity with respect to said reference potential;
said first engaged condition corresponding to the engagement of said first drive control contact means and said first contact element, whereby said first potential is applied to said servo-motor;
said second engaged condition corresponding to the engagement of said first drive control contact means and said second contact element, whereby said second potential is applied to said servo-motor;
said first and second contact elements being carried by said encoder disc in spaced-apart relationship;
said first drive control contact means being a single contact element intermediate said first and second contact elements, and rotatable about the axis of said encoder disc;
the engagement of the contact elements of said first and second contact means effecting follow-up servo movement of said encoder disc, and the disengagement of said contact elements providing a servo null condition;
said encoder disc having a plurality of channels of digital data in concentric annular array about a first surface thereof;
encoder output means positioned at a fixed position with respect to said encoder disc, whereby the controlled movement of said encoder disc provides corresponding digital data in registry with said encoder output means;
said encoder output means comprising a plurality of brushes, each in registry with a corresponding annular channel of said digital data.

8. A navigational apparatus comprising in combination:
altimeter means having an output shaft rotatable about a longitudinal axis responsive to altitude variation;
first contact means carried by said output shaft and movable therewith about said longitudinal axis;
an encoder disc longitudinally spaced from said output shaft, and rotatable about said longitudinal axis;
second contact means comprising a pair of contact elements carried by said encoder disc and rotatable therewith; said contact elements positioned in spaced-apart relationship about said first contact means, whereby rotation of said output shaft in a clockwise direction engages said first contact means and a first of said contact elements;
and rotation of said output shaft in a counterclockwise direction engages said first contact means and a second of said contact elements;
drive means operatively connected to said encoder disc for rotating said encoder disc about said longitudinal axis responsive to a drive control signal;
the engagement of said first and second contact means presenting a drive control signal to said drive means for rotating said encoder disc in a direction to defeat said contact engagement, whereby the disengagement of said first and second contact means provides a feed-back null signal to stop said drive means, corresponding to the follow-up positioning of said encoder disc with respect to said output shaft rotation.

9. A navigational apparatus comprising in combination:
altimeter means having an output shaft rotatable about a longitudinal axis responsive to altitude variation;
first contact means carried by said output shaft and movable therewith about said longitudinal axis;
an encoder disc longitudinally spaced from said output shaft, and rotatable about said longitudinal axis;
second contact means comprising a pair of contact elements carried by said encoder disc and rotatable therewith; said contact elements positioned in spaced-apart relationship about said first contact means, whereby rotation of said output shaft in a clockwise direction engages said first contact means and a first of said contact elements;
and rotation of said output shaft in a counterclockwise direction engages said first contact means and a second of said contact elements;
drive means operatively connected to said encoder disc for rotating said encoder disc about said longitudinal axis responsive to a drive control signal;
the engagement of said first and second contact means presenting a drive control signal to said drive means for rotating said encoder disc in a direction to defeat said contact engagement, whereby the disengagement of said first and second contact means provides a feed-back null signal to stop said drive means, corresponding to the follow-up positioning of said encoder disc with respect to said output shaft rotation;

said drive means including a polarity sensitive servo-motor;

a first terminal of said servo-motor connected to a reference potential, and a second terminal of said servo-motor connected to said first contact means;

said first and second contact elements having first and second potentials, respectively, applied thereto, said first and second potentials being of opposite polarity with respect to said reference potential, whereby the engagement of said first contact means with said first or second contact elements applies respectively opposite polarity drive control signals to said servo-motor.

References Cited by the Examiner
UNITED STATES PATENTS

| | | | |
|---|---|---|---|
| 1,835,907 | 12/1931 | Shiland | 318—31 X |
| 2,557,856 | 6/1951 | Angst et al. | 318—31 X |
| 2,866,184 | 12/1958 | Gary | 340—347 |
| 2,872,671 | 2/1959 | Walton | 340—347 |
| 2,978,693 | 4/1961 | Champion | 340—347 |

MAYNARD R. WILBUR, *Primary Examiner.*

DARYL W. COOK, MALCOLM A. MORRISON,
*Examiners.*

K. R. STEVENS, *Assistant Examiner.*